(12) United States Patent
Izumi et al.

(10) Patent No.: US 8,080,336 B2
(45) Date of Patent: Dec. 20, 2011

(54) ALKALINE DRY BATTERY

(75) Inventors: Hidekatsu Izumi, Osaka (JP); Susumu Kato, Osaka (JP); Kenji Yamamoto, Osaka (JP); Shinichi Sumiyama, Osaka (JP); Hirofumi Iwaki, Osaka (JP)

(73) Assignee: Panasonic Corporation, Osaka (JP)

( * ) Notice: Subject to any disclaimer, the term of this patent is extended or adjusted under 35 U.S.C. 154(b) by 692 days.

(21) Appl. No.: 12/159,039

(22) PCT Filed: Jun. 27, 2007

(86) PCT No.: PCT/JP2007/062917
§ 371 (c)(1),
(2), (4) Date: Jun. 24, 2008

(87) PCT Pub. No.: WO2008/001813
PCT Pub. Date: Jan. 3, 2008

(65) Prior Publication Data
US 2009/0053595 A1    Feb. 26, 2009

(30) Foreign Application Priority Data

Jun. 28, 2006  (JP) .................. 2006-177896
Jun. 28, 2006  (JP) .................. 2006-177898

(51) Int. Cl.
*H01M 4/13* (2010.01)
*H01M 4/58* (2010.01)
*H01M 6/08* (2010.01)
*H01M 2/02* (2010.01)
*H01M 6/04* (2010.01)
*H01M 10/26* (2010.01)
*H01M 2/16* (2010.01)

(52) U.S. Cl. ............ 429/218.1; 429/164; 429/166; 429/206; 429/223; 429/224; 429/250

(58) Field of Classification Search ............ 429/250, 429/248, 223, 224, 300, 218.1, 164, 166, 429/206
See application file for complete search history.

(56) References Cited

U.S. PATENT DOCUMENTS

| | | | |
|---|---|---|---|
| 4,195,120 A * | 3/1980 | Rossler et al. ............ 429/50 |
| 5,308,374 A | 5/1994 | Yoshizawa et al. |
| 5,378,559 A | 1/1995 | Randell et al. |
| 5,401,590 A * | 3/1995 | Chalilpoyil et al. ........ 429/59 |
| 6,287,723 B1 * | 9/2001 | Maeda et al. ............ 429/206 |
| 6,294,287 B1 | 9/2001 | Lee et al. |
| 6,586,139 B1 * | 7/2003 | Watanabe et al. ......... 429/304 |
| 6,902,843 B2 * | 6/2005 | Ishizuka et al. .......... 429/166 |
| 2003/0162092 A1 | 8/2003 | Armacanqui et al. |
| 2004/0033418 A1 | 2/2004 | Armacanqui et al. |
| 2004/0043292 A1 | 3/2004 | Christian et al. |
| 2004/0076878 A1 | 4/2004 | Ndzebet et al. |
| 2004/0197656 A1 | 10/2004 | Durkot et al. |
| 2005/0003272 A1 | 1/2005 | Jiang et al. |
| 2005/0106457 A1 | 5/2005 | Richards et al. |
| 2006/0083981 A1 | 4/2006 | Mori et al. |

FOREIGN PATENT DOCUMENTS

| | | |
|---|---|---|
| GB | 2 200 791 A | 8/1988 |
| JP | 55-12828 | 1/1980 |
| JP | 57-48635 | 3/1982 |
| JP | 60-180058 | 9/1985 |
| JP | 63-248064 | 10/1988 |
| JP | 63-248065 A | 10/1988 |
| JP | 63-254671 A | 10/1988 |
| JP | 3-37961 | 2/1991 |
| JP | 05-242881 A | 9/1993 |
| JP | 6-163024 | 6/1994 |
| JP | 7-122246 | 5/1995 |
| JP | 7-161357 | 6/1995 |
| JP | 7-245103 | 9/1995 |
| JP | 11-144690 | 5/1999 |
| JP | 2001-236930 | 8/2001 |
| JP | 2003-507857 A | 2/2003 |
| JP | 2005-078894 A | 3/2005 |
| JP | 2006-4900 | 1/2006 |
| JP | 2006-32320 | 2/2006 |
| WO | WO 01/13448 A1 | 2/2001 |
| WO | WO 2004/021484 A1 | 3/2004 |
| WO | WO 2005/008823 A2 | 1/2005 |
| WO | WO 2005/022675 A2 | 3/2005 |

OTHER PUBLICATIONS

Extended European Search Report issued in European Patent application No. EP 07767717.7 mailed Nov. 27, 2009.
D. Qu et al., "Behavior of Dinonylphenol Phosphate Ester and its influence on the oxidation of a Zn anode in alkaline solution," Journal of Power Sources, vol. 162, No. 1, Jun. 5, 2006, pp. 706-712.
Takeuchi, T., "Surfactant," Yoneda Shuppan, May 14, 1999, p. 149.

* cited by examiner

*Primary Examiner* — Keith Walker
*Assistant Examiner* — Julian Anthony
(74) *Attorney, Agent, or Firm* — McDermott Will & Emery LLP

(57) ABSTRACT

An alkaline dry battery of this invention includes: a positive electrode including at least one of a manganese dioxide powder and a nickel oxyhydroxide powder; a negative electrode including a zinc alloy powder; a separator interposed between the positive electrode and the negative electrode; an alkaline electrolyte; and a battery case for housing the positive electrode, negative electrode, the separator, and the alkaline electrolyte. The negative electrode further includes a surfactant that adsorbs to a surface of the zinc alloy powder during a non-discharge period and promptly desorbs from the surface of the zinc alloy powder upon start of discharge without impeding ion transfer in the alkaline electrolyte.

17 Claims, 2 Drawing Sheets

ALKALINE DRY BATTERY

RELATED APPLICATIONS

This application is the U.S. National Phase under 35 U.S.C. §371 of International Application No. PCT/JP2007/062917, filed on Jun. 27, 2007, which in turn claims the benefit of Japanese Application Nos. 2006-177896 and 2006-177898, both filed on Jun. 28, 2006, the disclosures of which Applications are incorporated by reference herein.

TECHNICAL FIELD

The present invention relates to alkaline dry batteries, and particularly, to a negative electrode of an alkaline dry battery.

BACKGROUND ART

Alkaline dry batteries generally have the following structure. A cylindrical positive electrode mixture containing a manganese dioxide powder or nickel oxyhydroxide as a positive electrode active material is disposed in a positive electrode case serving as a positive electrode terminal so as to closely adhere to the positive electrode case. In the center thereof, a negative electrode containing a zinc alloy powder as a negative electrode active material is disposed with a separator interposed therebetween. The negative electrode commonly used is a gel prepared by mixing a gelling agent such as sodium polyacrylate with an alkaline electrolyte.

In order to enhance the corrosion resistance of the negative electrode, it has been proposed to add an anionic surfactant, such as a polyoxyethylene alkyl ether phosphate in which the arkyl group has 6 or more carbon atoms (Patent Document 1) or a higher alcohol ether phosphate in which the arkyl group has 7 or more carbon atoms (Patent Document 2), to the gelled negative electrode as an anti-corrosive agent.

Meanwhile, phosphoric esters, which are anionic surfactants, are more likely to foam as the number of carbon atoms increases, and higher alcohol ether phosphates having about 13 carbon atoms in particular are high-foaming (Non-Patent Document 1).

Patent Document 1: Japanese Laid-Open Patent Publication No. Sho 55-69969
Patent Document 2: Japanese Laid-Open Patent Publication No. Sho 63-248064
Non-Patent Document 1: "Surfactant", Yoneda Shuppan, page 149

DISCLOSURE OF THE INVENTION

Problem to be Solved by the Invention

A surfactant forms aggregates which adsorb to the surface of the zinc alloy particles to form a protective coating layer. This protective coating layer prevents hydroxide ions and water from approaching the zinc alloy particles, thereby suppressing the reactions of formula (1) and formula (2) on the surface of the zinc alloy particles.

$$Zn + 4OH^- \rightarrow Zn(OH)_4^{2-} + 2e^- \quad (1)$$

$$2H_2O + 2e^- \rightarrow 2OH^- + H_2 \quad (2)$$

When the negative electrode reacts, the surfactant goes away from the surface of the zinc alloy particles and diffuses in the alkaline electrolyte. However, the surfactants of Patent Documents 1 and 2 strongly adsorb to the surface of the zinc alloy particles and diffuse at slow speeds, thereby impeding the electrode reaction of formula (1). As a result, there is a problem in that sufficient discharge performance cannot be obtained at a large current.

There is also another problem. That is, the addition of a high foaming surfactant to the negative electrode as described in Non-Patent Document 1 decreases the density of the negative electrode and the amount of the negative electrode active material filled therein, thereby resulting in degradation of discharge performance.

In particular, phosphoric esters having a large number of carbon atoms are insoluble in alkaline electrolyte. Thus, when a phosphoric ester is mixed with a zinc alloy powder, a gelling agent, and an alkaline electrolyte to prepare a gelled negative electrode, it is necessary to sufficiently stir the mixture such that the phosphoric ester is evenly diffused in the alkaline electrolyte. As a result, significant amount of bubbles are formed.

Recently, the number of digital devices that instantaneously require a heavy load has been increasing. However, conventional alkaline dry batteries in which a surfactant is added to their negative electrodes exhibit a phenomenon of a significant drop in closed-circuit voltage at the moment of application of a large load. For example, due to such voltage drop caused by the rush current to start up a device, the closed-circuit voltage of the battery may become lower than the operable voltage of the device. This eventually leads to a problem of being unable to obtain sufficient discharge capacity even if the alkaline dry battery has a sufficient operable capacity.

It is therefore an object of the present invention to solve the above-described problems and provide an alkaline dry battery that is excellent in leakage resistance and discharge performance in which gas production is suppressed without impeding the negative electrode reaction.

Means for Solving the Problem

The present invention is directed to an alkaline dry battery including: a positive electrode including at least one of a manganese dioxide powder and a nickel oxyhydroxide powder; a negative electrode including a zinc alloy powder; a separator interposed between the positive electrode and the negative electrode; an alkaline electrolyte; and a battery case for housing the positive electrode, the negative electrode, the separator, and the alkaline electrolyte, the battery case including a metal case composed mainly of iron and a nickel-containing layer formed on an inner face of the metal case. The present invention is characterized in that the negative electrode further includes a surfactant that adsorbs to a surface of the zinc alloy powder during a non-discharge period and promptly desorbs from the surface of the zinc alloy powder upon start of discharge without impeding ion transfer in the alkaline electrolyte.

The surfactant that satisfies one of the following conditions (A) and (B):

(A) the surfactant has a phosphate group as a hydrophilic group, no polyoxyethylene group, and at least one hydrocarbon group as a hydrophobic group in the molecule thereof, and the total number of carbon atoms in the at least one hydrocarbon group is 1 to 6; and (B) the surfactant has a phosphate group and a polyoxyethylene group as hydrophilic groups, and at least one hydrocarbon group as a hydrophobic group in the molecule thereof, and the total number of carbon atoms in the at least one hydrocarbon group is 1 to 4.

The surfactant is a phosphoric ester or an alkali metal salt thereof.

The surfactant is a polyoxyethylene alkyl ether phosphoric ester or an alkali metal salt thereof.

The surfactant is preferably at least one selected from the group consisting of compounds having structures represented by general formulas (1) to (3).

General Formula (1):

[Chemical formula 1]

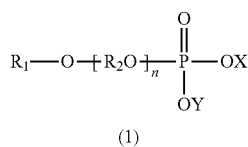

(1)

In formula (1), $R_1$ is a hydrocarbon group having 1 to 4 carbon atoms, $R_2$ is —$CH_2CH_2$— or —$CH_2(CH_3)CH_2$—, n=1 to 8, and each of X and Y is independently H, Na, or K.

General Formula (2):

[Chemical formula 2]

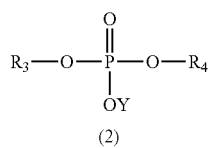

(2)

In formula (2), each of $R_3$ and $R_4$ is independently a hydrogen atom or a hydrocarbon group having 1 to 6 carbon atoms, the total number of carbon atoms in $R_3$ and $R_4$ is 1 to 6, and Y is H, Na, or K.

General Formula (3):

[Chemical formula 3]

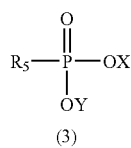

(3)

In formula (3), $R_5$ is a hydrocarbon group having 1 to 6 carbon atoms, and each of X and Y is independently H, Na, or K.

In general formula (1), preferably, $R_1$ is $C_mH_{2m+1}$—, and m=1 to 4.

In general formula (2), preferably, $R_3$ is $C_mH_{2m+1}$—, $R_4$ is $C_nH_{2n+1}$—, m=0 to 6, n=0 to 6, and m+n=1 to 6.

In general formula (3), preferably, $R_5$ is $C_nH_{2n+1}$—, and n=1 to 6.

The content of the surfactant in the negative electrode is preferably 0.005 to 1 part by weight per 100 parts by weight of the zinc alloy powder.

The zinc alloy powder preferably contains 30 to 250 ppm of bismuth.

Preferably, the negative electrode further includes a gelling agent and the alkaline electrolyte, and the content of the zinc alloy powder in the negative electrode is 170 to 220 parts by weight per 100 parts by weight of the alkaline electrolyte.

The zinc alloy powder of the negative electrode preferably contains 5 to 45% by weight of particles with particle sizes of 75 μm or less.

The nickel-containing layer of the battery case preferably has an average thickness of 0.05 to 1 μm.

The nickel-containing layer preferably comprises Ni, a Ni—Fe alloy, a Ni—Sn alloy, or a Ni—Co alloy.

The battery case is preferably prepared by press working a steel plate or nickel-plated steel plate into the shape of a can to form a metal case and applying a barrel plating to an inner surface of the metal case to form a nickel-containing layer.

The alkaline dry battery of the present invention satisfies the following conditions (C) and (D):

(C) a AA alkaline dry battery in which the difference between an open-circuit voltage and a closed-circuit voltage upon discharge at 2.0 A for 10 milliseconds is 0.24 V or less; and (D) the negative electrode produces gas at a speed of 2.5 μl/g·day or less.

The alkaline dry battery further satisfies condition (E):

(E) when 10 ppm of iron is added to the negative electrode, the negative electrode produces gas at a speed of 4.0 μl/g·day or less.

The alkaline dry battery further satisfies condition (F):

(F) when 10 ppm of nickel is added to the negative electrode, the negative electrode produces gas at a speed of 3.8 μl/g·day or less.

EFFECTS OF THE INVENTION

According to the present invention, since gas production can be suppressed without impeding the negative electrode reaction, it is possible to provide good leakage resistance and good discharge performance at the same time.

BEST MODE FOR CARRYING OUT THE INVENTION

Figure 1:
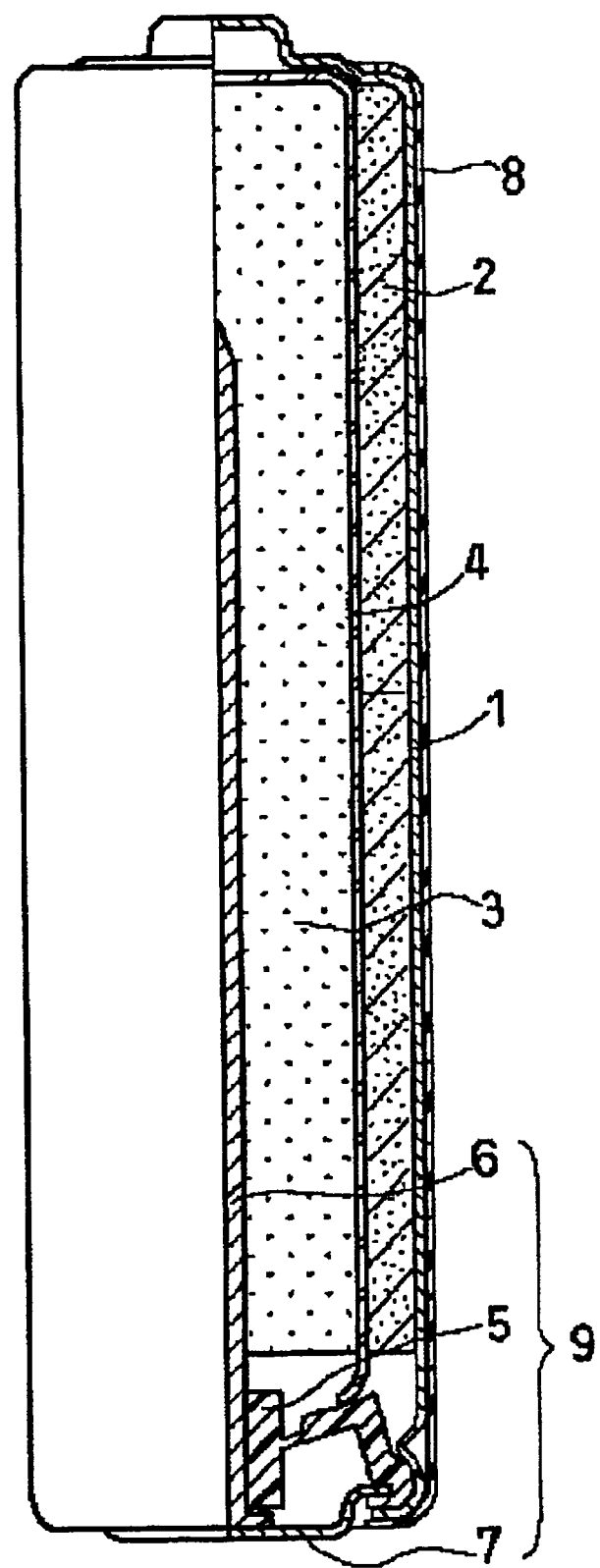
FIG. 1 is a partially sectional front view of an alkaline dry battery of the present invention.

The present invention relates to an alkaline dry battery which includes a positive electrode including at least one of a manganese dioxide powder and a nickel oxyhydroxide powder, a negative electrode including a zinc alloy powder, a separator interposed between the positive electrode and the negative electrode, and an alkaline electrolyte. The positive and negative electrodes, the separator, and the alkaline electrolyte are housed in a battery case including a metal case composed mainly of iron and a nickel-containing layer formed on an inner face of the metal case. The present invention is characterized in that the negative electrode further includes a surfactant that satisfies one of the following conditions (A) and (B):

(A) the surfactant has a phosphate group as a hydrophilic group, no polyoxyalkylene group, and at least one hydrocarbon group as a hydrophobic group in the molecule thereof, and the total number of carbon atoms in the at least one hydrocarbon group is 1 to 6; and (B) the surfactant has a phosphate group and a polyoxyalkylene group as hydrophilic groups and at least one hydrocarbon group as a hydrophobic group in the molecule thereof, and the total number of carbon atoms in the at least one hydrocarbon group is 1 to 4.

The surfactant satisfying one of conditions (A) and (B) adsorbs to the surface of the zinc alloy powder during a non-discharge period and promptly desorbs from the surface of the zinc alloy powder upon start of discharge without impeding ion transfer in the alkaline electrolyte.

Hence, gas production can be suppressed without impeding the negative electrode reaction, and it is therefore possible to provide good leakage resistance and good discharge performance at the same time.

In condition (A), if the total number of carbon atoms in the at least one hydrocarbon group being the hydrophobic group exceeds 6, the negative electrode reaction is impeded, thereby resulting in degradation of discharge performance.

In condition (B), if the total number of carbon atoms in the at least one hydrocarbon group being the hydrophobic group exceeds 4, the negative electrode reaction is impeded, thereby resulting in degradation of discharge performance. The degree of polymerization of the polyoxyarkyl group is preferably 8 or less since good discharge performance can be obtained.

In condition (A) or (B), the hydrocarbon group may have a double bond or may be a straight chain or branched. Examples include $CH_3CH_2CH(CH_3)-$ and $CH_3CH=CHCH_2-$.

Preferably, the surfactant is, for example, a phosphoric ester or an alkali metal salt thereof.

Also, preferably, the surfactant is, for example, a polyoxyethylene alkyl ether phosphate or an alkali metal salt thereof.

The surfactant is preferably at least one selected from the group consisting of compounds having structures represented by the following general formulas (1) to (3).

General Formula (1):

[Chemical formula 4]

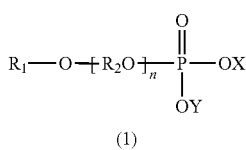

(1)

In formula (1), $R_1$ is a hydrocarbon group having 1 to 4 carbon atoms, $R_2$ is $-CH_2CH_2-$ or $-CH_2(CH_3)CH_2-$, n=1 to 8, and each of X and Y is independently H, Na, or K.

General Formula (2):

[Chemical formula 5]

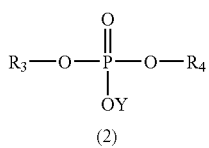

(2)

In formula (2), each of $R_3$ and $R_4$ is independently a hydrogen atom or a hydrocarbon group having 1 to 6 carbon atoms, the total number of carbon atoms in $R_3$ and $R_4$ is 1 to 6, and Y is H, Na, or K.

General Formula (3):

[Chemical formula 6]

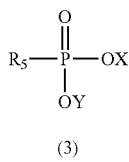

(3)

In formula (3), $R_5$ is a hydrocarbon group having 1 to 6 carbon atoms, and each of X and Y is independently H, Na, or K.

In general formula (1), for example, $R_1$ is $C_mH_{2m+1}-$, and m=1 to 4.

In general formula (2), for example, $R_3$ is $C_mH_{2m+1}-$, $R_4$ is $C_nH_{2n+1}-$, m=0 to 6, n=0 to 6, and m+n=1 to 6.

In general formula (3), for example, $R_5$ is $C_nH_{2n+1}-$, and n=1 to 6.

The content of the surfactant in the negative electrode is preferably 0.005 to 1 part by weight per 100 parts by weight of the zinc alloy powder since good leakage resistance and good discharge performance can be obtained at the same time.

If the content of the surfactant in the negative electrode is less than 0.005 part by weight per 100 parts by weight of the zinc alloy powder, sufficient corrosion resistance of the negative electrode cannot be obtained. If the content of the surfactant in the negative electrode exceeds 1 part by weight per 100 parts by weight of the zinc alloy powder, the discharge performance lowers. The content of the surfactant in the negative electrode is more preferably 0.005 to 0.3 part by weight per 100 parts by weight of the zinc alloy powder since better discharge performance can be obtained.

Further, more preferably, the content of the surfactant in the negative electrode is 0.02 to 0.1 part by weight per 100 parts by weight of the zinc alloy powder.

The zinc alloy powder preferably contains 30 to 250 ppm of bismuth. The method of adding bismuth with a high hydrogen overvoltage to a zinc alloy as an inorganic anti-corrosive agent is known, but bismuth promotes the passivation of zinc during discharging, thereby impeding the negative electrode reaction. However, since the above-mentioned surfactant functions as an effective anti-corrosive agent, the amount of bismuth added can be reduced and the corrosion resistance of the negative electrode can be sufficiently improved without impeding the discharge performance.

If the content of bismuth in the zinc alloy powder is less than 30 ppm, the corrosion resistance of the negative electrode cannot be maintained. If the content of bismuth in the zinc alloy powder exceeds 250 ppm, the bismuth content becomes high, so that the discharge performance tends to lower.

The negative electrode used is, for example, a gelled negative electrode containing the above-mentioned surfactant, a zinc alloy powder, an alkaline electrolyte, and a gelling agent.

The content of the zinc alloy powder in the negative electrode is preferably 170 to 220 parts by weight per 100 parts by weight of the alkaline electrolyte.

If the content of the zinc alloy powder in the negative electrode is less than 170 parts by weight per 100 parts by weight of the alkaline electrolyte contained in the negative electrode, the gelled negative electrode is likely to foam, so that the discharge performance lowers. On the other hand, if the content of the zinc alloy powder in the negative electrode exceeds 220 parts by weight per 100 parts by weight of the alkaline electrolyte contained in the negative electrode, the amount of the alkaline electrolyte in the negative electrode is too little, so that the discharge performance lowers.

It is generally known that when a surfactant such as a phosphoric ester is added to an aqueous solution, the stability of bubbles increases. Thus, during negative electrode preparation, the gelled negative electrode foams to encapsulate air, thereby resulting in a decrease in the density of the gelled negative electrode. The present inventors have examined the relation between the ratio of the amount of zinc alloy powder to the amount of alkaline electrolyte in the gelled negative electrode and the foamability of the gelled negative electrode. As a result, they have found that the higher the ratio of the amount of zinc alloy powder to the amount of alkaline electrolyte, the more effectively the decrease in negative electrode density due to foaming is suppressed. This is probably because the bubble-destroying effect of the zinc alloy particles having complicated shapes increased.

In the negative electrode, the zinc alloy powder preferably contains 5 to 45% by weight of particles with particle sizes of 75 μm or less. When the content of the particles with particle sizes of 75 μm or less in the zinc alloy powder is not less than 5% by weight, the reaction efficiency of the negative electrode improves, so that the discharge performance improves. If the content of the particles with particle sizes of 75 μm or less in the zinc alloy powder is more than 45% by weight, the productivity lowers in the step of filling the gelled negative electrode. More preferably, the zinc alloy powder contains 25 to 45% by weight of particles with particle sizes of 75 μm or less.

For example, a zinc alloy powder containing 5 to 45% by weight of particles with particle sizes of 75 μm or less can be obtained by classifying zinc alloy powder with sieves having openings of 75 μm and 425 μm, and mixing the classified powder of particles of 75 to 425 μm with a predetermined weight of a powder of particles of 75 μm or less.

Also, by classifying the obtained zinc powder with a sieve having an opening of 75 μm and weighing the classified powder, it is possible to confirm that the zinc alloy powder contains 5 to 45% by weight of particles with particle sizes of 75 μm or less.

Pulverization of a zinc alloy powder to increase the reaction efficiency of the negative electrode has had a problem of increased negative electrode viscosity and poor productivity.

However, the addition of the above-mentioned surfactant decreases the viscosity of the gelled negative electrode. This is probably because the interfacial tension between the alkaline electrolyte and the zinc alloy particles, and between the alkaline electrolyte and the gelling agent decreases to increase the wettability of the zinc alloy particles and the gelling agent, and the increased lubricity can reduce the friction due to collision of the zinc alloy particles and the gelling agent. The decrease in the viscosity of the gelled negative electrode enhances the productivity of the step of filling the gelled negative electrode into the battery case. It is known that phosphoric esters with short carbon chains in particular are highly capable of lowering interfacial tension (see Japanese Examined Patent Publication Sho 55-22587).

Hence, due to the above-mentioned addition of the surfactant to the gelled negative electrode, even when a fine powder of a zinc alloy is used, the increase in the viscosity of the gelled negative electrode can be suppressed, so that the discharge performance can be enhanced without lowering the productivity.

Using the surfactants of the present invention, the present inventors have made various examinations on the relation between the thickness of the nickel-containing layer formed on the inner face of the battery case and the amount of gas produced in the negative electrode. As a result, they have found that when the average thickness of the nickel-containing layer is in the range of 0.05 to 1 μm, good leakage resistance and good discharge performance can be obtained at the same time. If the average thickness of the nickel-containing layer is less than 0.05 μm, it is difficult to sufficiently suppress the production of gas. If it exceeds 1 μm, it is difficult to obtain substantial cost merit. The average thickness of the nickel-containing layer is more preferably 0.05 to 0.5 μm since it is advantageous in costs.

Conventionally, for example, a nickel-containing layer with a thickness of 0.15 to 3 μm is formed on the inner face of a battery case (see Japanese Laid-Open Patent Publication No. Hei 7-122246). If the thickness of the nickel layer is reduced to cut material costs, it is difficult to reliably prevent the corrosion of iron due to alkaline electrolyte. In some cases, iron dissolved in alkaline electrolyte may be deposited on the surface of the zinc particles in the negative electrode, thereby increasing the amount of gas production and resulting in leakage.

Contrary to this, according to the present invention, it is possible to reduce the thickness of the nickel-containing layer compared with conventional thickness, decrease the amount of nickel plating, and cut material costs. The surfactant of the present invention is resistant to impurities such as iron, i.e., has a property of suppressing the production of gas due to impurities such as iron.

The average thickness of the nickel-containing layer as used herein refers to a value obtained by measuring the thickness of the nickel-containing layer at least three locations on the inner face of the cylindrical side wall of the battery case at half the height of the battery case and averaging the measured values. The measurement of the thickness of the nickel-containing layer can be made, for example, by fluorescent X-ray analysis (energy-dispersive fluorescent X-ray analyzer EDX-700HS available from Shimadzu Corporation).

The nickel-containing layer is, for example, a Ni layer or a Ni-M alloy layer (element M is Fe, Sn, or Co). The content of the element M in the Ni-M alloy layer is preferably 30 to 80% by weight. If the content of the element M in the Ni-M alloy layer is less than 30% by weight, the workability of the battery case in can-making becomes poor. On the other hand, if the content of the element M in the Ni-M alloy layer is more than 80% by weight, the corrosion resistance of the battery case decreases.

Among them, a battery case having a Ni layer or a Ni—Fe alloy layer is particularly preferred in terms of workability, material costs, and stability of the inner face of the battery case with respect to corrosion.

The battery case may be prepared by press working a steel plate or nickel-plated steel plate into the shape of a can and applying a barrel plating to the inner surface thereof to form a nickel-containing layer.

The alkaline dry battery of the present invention made with the gelled negative electrode including a surfactant satisfying the above condition (A) or (B) satisfies the following conditions (C) and (D):

(C) a AA alkaline dry battery in which the difference between an open-circuit voltage and a closed-circuit voltage upon discharge at 2.0 A for 10 milliseconds is 0.24 V or less; and (D) the negative electrode produces gas at a speed of 2.5 μl/g·day or less.

For example, in the case of using compounds represented by the above general formulas (1) to (3) as the surfactant, if the content of the surfactant in the negative electrode is 0.005 to 1 part by weight per 100 parts by weight of the zinc alloy powder, the above conditions (C) and (D) are satisfied.

The above-mentioned surfactant is resistant to iron as an impurity, i.e., has a property of suppressing the production of gas due to the presence of iron, so the above-mentioned alkaline dry battery further satisfies the following condition (E).

(E) when 10 ppm of iron is added to the negative electrode, the negative electrode produces gas at a speed of 4.0 μl/g·day or less.

The above-mentioned surfactant is resistant to nickel as an impurity, i.e., has a property of suppressing the production of gas due to the presence of nickel, so the above-mentioned alkaline dry battery further satisfies the following condition (F).

(F) when 10 ppm of nickel is added to the negative electrode, the negative electrode produces gas at a speed of 3.8 µl/g·day or less.

The gas production speed of a gelled negative electrode can be obtained, for example, by the method described in Japanese Laid-Open Patent Publication No. Sho 57-048635, Japanese Laid-Open Patent Publication No. Hei 7-245103, or Japanese Laid-Open Patent Publication No. 2006-4900. Specifically, the gas production speed of a gelled negative electrode can be obtained, for example, by the following method.

A gelled negative electrode of 5 g collected from a disassembled alkaline dry battery is placed in a gas-collecting glass container equipped with a graduated narrow tube. Liquid paraffin is then poured thereinto such that the gelled negative electrode is completely buried without leaving air. Thereafter, the glass container is immersed in a 45° C. constant-temperature water tank and left for approximately 3 hours such that the temperature inside the glass container is kept constant. It is then stored for 3 days. After the 3-day storage, the graduation of the liquid level of the liquid paraffin is read to determine the distance that the liquid level of the liquid paraffin has moved during the storage and to measure the total amount of gas produced in 3 days. The gas production speed is calculated from the following formula:

Gas production speed(µl/g·day)=Total amount of gas produced in 3 days(µl)÷5(g)÷3(day)

Also, the gas production speed for the addition of 10 ppm of iron or nickel to a gelled negative electrode can be obtained by the following method.

It is difficult to add a trace amount of iron or nickel accurately. Thus, a part of a gel prepared by evenly dispersing an iron powder or nickel powder in a previously prepared gelled alkaline electrolyte (hereinafter referred to as an impurity-dispersed gel) is added to a gelled negative electrode.

The impurity-dispersed gel can be prepared, for example, by adding 0.1 g of an iron or nickel powder as an impurity and 49.43 g of a sodium polyacrylate powder as a gelling agent to 800 g of a 35% by weight potassium hydroxide aqueous solution and mixing them for 30 minutes. The concentration of iron or nickel in the impurity-dispersed gel is 118 ppm.

An example of iron powder which may be used is a reagent of Wako Pure Chemical Industries, Ltd. with a particle size of −20 mesh. An example of nickel powder which may be used is a reagent of Kanto Chemical Co., Inc. with a particle size of 3 to 7 µm. Examples of gelling agents which may be used include CARBOPOL C940 of B. F. Goodrich (U.S.A.), AQU-PEC HV-505E of Sumitomo Seika Chemicals Co., Ltd., and Sanfresh DK-500 of Sanyo Chemical Industries, Ltd.

A gelled negative electrode of 5 g collected from a disassembled alkaline dry battery is placed in a gas-collecting glass container, and 0.464 g of the impurity-dispersed gel is added thereto to obtain a gelled negative electrode containing 10 ppm of iron or nickel. Using this gelled negative electrode, the gas production speed can be determined in the same manner as described above.

Referring to FIG. 1, one embodiment of the present invention is described. FIG. 1 is a partially sectional front view of a AA alkaline dry battery of the present invention.

A hollow cylindrical positive electrode 2 is contained in a cylindrical battery case 1 with a bottom, which serves as a positive electrode terminal and a positive electrode current collector, such that it is in contact with the inner face of the battery case 1. A negative electrode 3 is disposed in the hollow of the positive electrode 2 with a cylindrical separator 4 with a bottom interposed therebetween. The opening of the battery case 1 containing the power generating elements such as the positive electrode 2 and the negative electrode 3 is sealed with an assembled sealing member 9, which is prepared by integrating a resin sealing member 5 with a negative electrode terminal plate 7 electrically connected to a nail-like negative electrode current collector 6. The outer surface of the battery case 1 is covered with an exterior label 8.

The battery case 1 comprises a metal case composed mainly of iron and a nickel-containing layer formed on the inner face of the metal case. The battery case can be prepared, for example, by press working a nickel-plated steel plate into predetermined dimensions/shape. Examples of press working include deep drawing, DI (Drawing and Ironing), and DTR (Draw Thin and Redraw), which are conventionally employed in can-making process. The battery can be obtained by known methods described in, for example, Japanese Laid-Open Patent Publication No. Sho 60-180058 and Japanese Laid-Open Patent Publication No. Hei 11-144690.

The battery case 1 can be obtained, for example, by press working a steel plate into the shape of a can to form a metal case and applying a barrel plating to the inner face of the iron case to form a nickel-containing layer, as described above. Also, in consideration of corrosion resistance and appearance, a nickel-containing layer may also be formed on the outer face of the metal case in addition to the inner face of the metal case.

The steel plate is composed mainly of iron and includes, for example, trace amounts of elements such as Mn, Al, C, Si, S, and P.

The positive electrode 2 can be, for example, a mixture containing a positive electrode active material such as an electrolytic manganese dioxide powder, a nickel oxyhydroxide powder, or a mixture thereof, a conductive agent such as a graphite powder, and an alkaline electrolyte. Also, a binder such as a polyethylene powder or a lubricant such as stearate may also be added if necessary.

The negative electrode 3 can be prepared, for example, by adding a gelling agent such as sodium polyacrylate to an alkaline electrolyte containing a surfactant to form a gel and dispersing and mixing a zinc alloy powder as a negative electrode active material in the gel. To improve corrosion resistance, a metal compound with a high hydrogen overvoltage such as indium or bismuth may be added if necessary. Also, to suppress the growth of zinc dendrites, a trace amount of a silicon compound such as silicic acid or a salt thereof may be added if necessary. As described above, by adding a surfactant to an alkaline electrolyte used to prepare a negative electrode, it is possible to disperse the surfactant in the negative electrode reliably and evenly.

The zinc alloy powder is preferably highly resistant to corrosion, and more preferably free from mercury, cadmium, or lead, or any of them in consideration of the environment. The zinc alloy can contain, for example, 0.01 to 0.1% by weight of indium, 0.003 to 0.025% by weight of bismuth, and 0.001 to 0.005% by weight of aluminum. It may contain only one kind of these elements or may contain 2 or more kinds.

The separator 4 can be, for example, a non-woven fabric composed mainly of polyvinyl alcohol fiber and rayon fiber. The separator 4 can be prepared by known methods described, for example, in Japanese Laid-Open Patent Publication No. Hei 6-163024 and Japanese Laid-Open Patent Publication No. 2006-32320.

The positive electrode 2, the negative electrode 3, and the separator 4 contain an alkaline electrolyte. The alkaline electrolyte can be, for example, an alkaline aqueous solution containing 30 to 40% by weight of potassium hydroxide and 1 to 3% by weight of zinc oxide. Further, the alkaline electrolyte may contain an additive that is dissolved or dispersed, such as the above-mentioned surfactant, depending on the purpose.

EXAMPLES

Examples of the present invention are hereinafter described in detail, but the present invention is not to be limited to these Examples.

AA alkaline dry batteries illustrated in FIG. 1 were produced as alkaline dry batteries of the present invention in the following procedure. FIG. 1 is a partially sectional front view of an alkaline dry battery in an Example of the present invention.

Examples 1 to 9 and Comparative Examples 1 to 3

(1) Production of Battery Case

A 0.4-mm thick, cold-rolled steel plate in the form of a hoop was prepared, and a nickel-containing layer was formed on each side of the steel plate by an electrolytic plating step under the conditions shown in Table 1 and an annealing step at a soaking temperature of 550° C. and a dew point of −40° C. using a protective gas composed of 6.5% of hydrogen gas and 93.5% of nitrogen gas for 6 hours. In this way, a nickel-plated steel plate was obtained.

TABLE 1

| Item | Condition | |
| --- | --- | --- |
| Bath composition | Nickel sulfate | 250 g/L |
| | Nickel chloride | 45 g/L |
| | Boric acid | 30 g/L |
| Bath temperature | | 50° C. |
| Current density | | 0.1 A/cm$^2$ |
| pH | | 4.3 |

The nickel-plated steel plate was punched out into a disc, which was then worked into a cup-shaped intermediate product. Subsequently, the cup-shaped intermediate product was subjected to a DI process in which drawing using two drawing dies and ironing using three ironing dies were continuously performed to make a can. In this way, a battery case 1 with an outer diameter of 13.90 mm and a side wall thickness of 0.18 mm was obtained. The center of the bottom of the battery case 1 was provided with a protrusion (protruding toward the outside of the battery case 1) serving as a positive electrode terminal. The nickel-containing layer on the inner face of the can was a Ni—Fe alloy layer with an average thickness of 1.0 µm.

The average thickness of the Ni—Fe alloy layer was determined by fluorescent X-ray analysis (energy-dispersive fluorescent X-ray analyzer EDX-700HS available from Shimadzu Corporation). The average thickness of the Ni—Fe alloy layer was obtained by measuring three locations on the inner face of the cylindrical side wall at half the height of the battery case and averaging the measured values.

(2) Preparation of Positive Electrode

Electrolytic manganese dioxide and graphite were mixed together in a weight ratio of 92:8. This mixture was mixed with an alkaline electrolyte in a weight ratio of 100:2, sufficiently stirred, and compression molded into flakes. The positive electrode flakes were crushed into granules, which were then classified with a sieve to obtain 10 to 100 mesh granules. They were pressure molded into a hollow cylindrical shape to obtain a pellet of a positive electrode 2 with a weight of 5.4 g. The electrolytic manganese dioxide used was a manganese dioxide powder with a purity of 92% by weight and a mean particle size of 38 µm. Also, the graphite used was a powder with a mean particle size of 17 µm. The alkaline electrolyte used was a mixture of potassium hydroxide, zinc oxide and water in a weight ratio of 35:2:63.

(3) Preparation of Gelled Negative Electrode

Zinc was heated to an approximately 500° C. so that it was melted. To the zinc was added 50 ppm of aluminum, 250 ppm of indium, and 200 ppm of bismuth. The resultant mixture was melted and dropped in the form of a narrow stream and compressed air was caused to blow thereon. In this way, a zinc alloy powder containing 50 ppm of aluminum, 250 ppm of indium, and 200 ppm of bismuth was obtained.

The resultant zinc alloy powder was classified with sieves having openings of 75 µm and 425 µm, and the classified powder of particles of 75 to 425 µm was mixed with a predetermined weight of a powder of particles of 75 µm or less. In this way, a zinc alloy powder containing 25% by weight of a fine powder with particle sizes of 75 µm or less was obtained.

The same alkaline electrolyte as described above, a surfactant, sodium polyacrylate serving as a gelling agent, and the zinc alloy powder thus obtained were mixed together in a weight ratio of 50:0.1:1.5:100, to obtain a negative electrode 3. The amount of the surfactant added to the negative electrode 3 was 0.1 part by weight per 100 parts by weight of the zinc alloy powder. Also, the amount of the zinc alloy powder added to the negative electrode 3 was 200 parts by weight per 100 parts by weight of the electrolyte used in the negative electrode 3.

(4) Assembly of Alkaline Dry Battery

Two pellets of the positive electrode 2 obtained in the above manner were inserted in the battery case 1 and pressed with a pressing jig so that the positive electrode 2 was closely adhered to the inner wall of the battery case 1. A cylindrical separator 4 with a bottom was then disposed in the hollow of the positive electrode 2 in close contact with the inner wall of the battery case 1. An alkaline electrolyte of 1.7 g was injected into the separator 4. After 15 minutes, 6.5 g of the negative electrode 3 obtained in the above manner was filled into the space inside the separator 4. The separator 4 used was a non-woven fabric composed mainly of polyvinyl alcohol fiber and rayon fiber. The open of the battery case 1 was sealed with an assembled sealing member 9, and the outer surface of the battery case 1 was covered with an outer label 8. In this way, a AA alkaline dry battery illustrated in FIG. 1 was produced.

In the preparation of the above-mentioned alkaline dry battery, a polyoxyethylene alkyl ether phosphate represented by the following general formula (4), which is a compound represented by general formula (1), was used as the surfactant added to the negative electrode. R represents —$CH_2CH_2$— or —$CH(CH_3)CH_2$—.

General Formula (4):

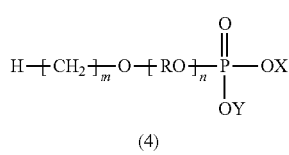

(4)

The polyoxyethylene alkyl ether phosphate was prepared via an esterification reaction between phosphoric acid and the product of an etherification reaction between alkyl alcohol and polyethylene glycol.

At this time, the degree of polymerization of ethylene glycol of the polyethylene glycol, the number of carbon atoms in the arkyl group of the alkyl alcohol, and the kind of the salt used to neutralize the phosphate group were changed. That is, the structural parameters m, n, X, and Y of the following general formula (4) were varied as shown in Table 2, to prepare compounds 1 to 11.

In the battery of Comparative Example 3 in which a conventional surfactant was added to the negative electrode, the surfactant strongly adsorbed to the surface of the zinc alloy powder. Hence, at the moment of start of the discharge, the surfactant hampered the ion transfer in the alkaline electrolyte and did not promptly go away from the surface of the zinc alloy powder. As a result, the closed-circuit voltage once dropped significantly, and after some delay, showed a behavior of smooth reaction.

Contrary to this, the battery of Example 2 of the present invention exhibited neither significant drop in closed-circuit voltage nor delay such as those found in the battery of Comparative Example 3.

(C) Evaluation of Discharge Performance

In a constant-temperature environment at 21±2° C., the respective alkaline dry batteries were subjected to a pulse discharge that 1.5 W discharge for 2 seconds and 0.65 W discharge for 28 seconds per hour were alternately repeated in 10 cycles per hour. The discharge duration to a closed-circuit voltage of 1.05 V was checked. This evaluation is in conformity with the discharge test method defined by ANSI C18.1M. The battery discharge capacity was expressed as a

TABLE 2

| | | | | | | AA alkaline dry battery | | | | |
|---|---|---|---|---|---|---|---|---|---|---|
| | Negative electrode Surfactant | | | | | Number of leaked batteries upon storage at 60° C. | | | Voltage drop upon start of 2.0 A discharge (V) | Discharge performance (ratio) |
| | Compound No. | Structural parameter | | | | 4 months | 8 months | 12 months | | |
| | | m | n | X | Y | | | | | |
| Ex. 1 | Compound 1 | 4 | 1 | H | H | 0 | 0 | 0 | 0.202 | 120 |
| Ex. 2 | Compound 2 | 4 | 1 | Na | Na | 0 | 0 | 0 | 0.199 | 123 |
| Ex. 3 | Compound 3 | 4 | 1 | K | K | 0 | 0 | 0 | 0.206 | 119 |
| Ex. 4 | Compound 4 | 1 | 1 | Na | Na | 0 | 0 | 0 | 0.201 | 121 |
| Ex. 5 | Compound 5 | 1 | 8 | Na | Na | 0 | 0 | 0 | 0.213 | 118 |
| Ex. 6 | Compound 6 | 2 | 4 | H | Na | 0 | 0 | 0 | 0.218 | 116 |
| Ex. 7 | Compound 7 | 4 | 4 | Na | Na | 0 | 0 | 0 | 0.221 | 114 |
| Ex. 8 | Compound 8 | 4 | 8 | Na | Na | 0 | 0 | 0 | 0.227 | 113 |
| Ex. 9 | Compound 9 | 2 | 10 | Na | Na | 0 | 0 | 0 | 0.267 | 103 |
| Comp. Ex. 2 | Compound 10 | 8 | 4 | Na | Na | 0 | 0 | 0 | 0.284 | 101 |
| Comp. Ex. 3 | Compound 11 | 20 | 10 | Na | Na | 0 | 0 | 0 | 0.316 | 100 |
| Comp. Ex. 1 | | | | | | 0 | 3 | 6 | 0.191 | 121 |

The respective alkaline dry batteries obtained in the above manner were evaluated as follows.

(A) Evaluation of Leakage-Resistance Characteristic

For each kind of the alkaline dry batteries, 150 batteries were prepared and stored at 60° C. After storage for 4 months, 8 months, and 12 months, the number of leaked alkaline dry batteries was checked.

(B) Measurement of Voltage Drop Upon Start of Heavy Load Discharge

The respective alkaline dry batteries were discharged at 2.0 A in a constant-temperature environment at 20±2° C. At this time, the open-circuit voltage of each alkaline dry battery immediately before the discharge and the lowest closed-circuit voltage in 10 milliseconds after the start of the discharge were measured, and the difference therebetween was calculated as a voltage drop.

Figure 2:
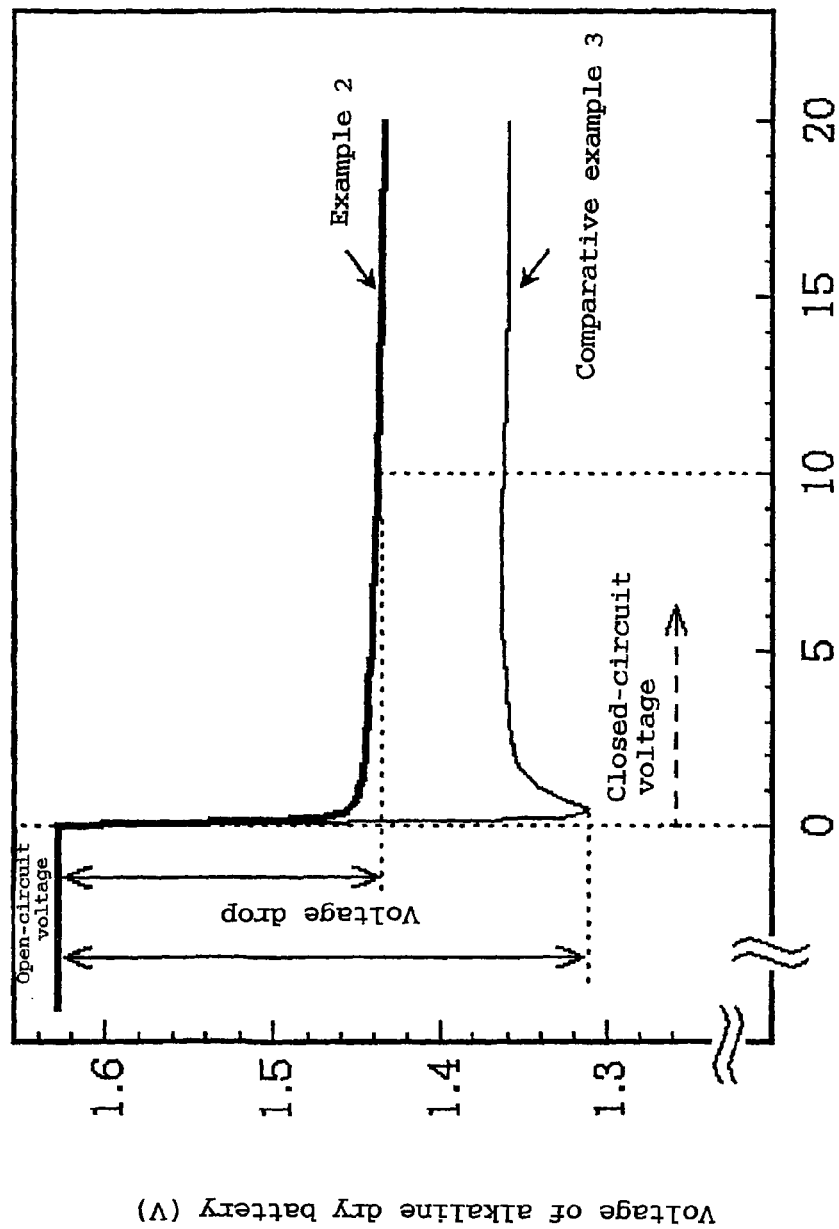
FIG. 2 is a graph showing voltage behaviors of the battery of Example 2 of the present invention and the battery of Comparative Example 3 discharged at 2.0 A.

FIG. 2 shows behaviors of voltage drop of alkaline dry batteries discharged at 2.0 A. The thick solid line represents the discharge curve of the battery of Example 2 of the present invention, while the thin solid line represents the discharge curve of the battery of Comparative Example 3.

ratio relative to the discharge capacity of the alkaline dry battery of Comparative Example 3 using a conventional polyoxyethylene alkyl ether phosphate in which the arkyl group has 20 carbon atoms, which was defined as 100.

These evaluation results are shown in Table 2.

In the case of Comparative Example 1 including no surfactant in the negative electrode, some batteries were found to be leaking due to gas production caused by zinc alloy corrosion.

The batteries of Comparative Examples 2 and 3 exhibited improved leakage resistance, but the discharge performance lowered since the movement or diffusion of the surfactant in the alkaline electrolyte was hindered due to the large number of carbon atoms in the terminal hydrocarbon group serving as the hydrophobic group.

Contrary to this, the batteries of Examples 1 to 9 of the present invention, in which a compound of general formula (4) where m is 1 to 4 was added to the negative electrode, showed a reduced voltage drop and improved discharge performance compared with the batteries of Comparative Examples 2 and 3, since the compound can promptly go away from the surface of the zinc alloy powder without impeding the ion transfer in the alkaline electrolyte in the vicinity of the surface of the zinc alloy powder. Also, the batteries of 21 to the negative electrode, and they were evaluated in the same manner as described above. These evaluation results are shown in Table 3.

TABLE 3

| | | | | | | | AA alkaline dry battery | | | |
|---|---|---|---|---|---|---|---|---|---|---|
| | | Negative electrode Surfactant | | | | | Number of leaked batteries upon storage at 60° C. | | | Voltage drop upon start of 2.0 A | Discharge |
| | | Compound | Structural parameter | | | | 4 | 8 | 12 | discharge | performance |
| | | No. | m | n | m+n | X | Y | months | months | months | (V) | (ratio) |
| Comp. Ex. 4 | Compound 12 | 8 | 0 | 8 | Na | Na | 0 | 0 | 0 | 0.283 | 99 |
| Ex. 10 | Compound 13 | 6 | 0 | 6 | Na | Na | 0 | 0 | 0 | 0.234 | 108 |
| Ex. 11 | Compound 14 | 4 | 0 | 4 | Na | Na | 0 | 0 | 0 | 0.221 | 117 |
| Ex. 12 | Compound 15 | 2 | 0 | 2 | Na | Na | 0 | 0 | 0 | 0.210 | 124 |
| Ex. 13 | Compound 16 | 1 | 0 | 1 | Na | Na | 0 | 0 | 0 | 0.207 | 122 |
| Comp. Ex. 5 | Compound 17 | 2 | 6 | 8 | H | Na | 0 | 0 | 0 | 0.271 | 100 |
| Ex. 14 | Compound 18 | 2 | 4 | 6 | H | Na | 0 | 0 | 0 | 0.220 | 111 |
| Ex. 15 | Compound 19 | 2 | 2 | 4 | H | Na | 0 | 0 | 0 | 0.203 | 121 |
| Ex. 16 | Compound 20 | 1 | 0 | 1 | H | H | 0 | 0 | 0 | 0.210 | 122 |
| Ex. 17 | Compound 21 | 6 | 0 | 6 | K | K | 0 | 0 | 0 | 0.215 | 112 |
| Comp. Ex. 1 | | | | | | | 0 | 3 | 6 | 0.195 | 121 |

Examples 1 to 9 provided superior leakage resistance to the battery of Comparative Example 1.

In particular, the batteries of Examples 1 to 8 of the present invention, in which a compound of general formula (4) where m is 1 to 4 and n is 1 to 8 was added to the negative electrode, exhibited a significantly reduced voltage drop and excellent discharge performance and leakage resistance.

Also, the results of the batteries of Examples 1 to 3 showed that changing X and Y in general formula (4) to H, Na, or K makes no particular difference in battery characteristics.

Examples 10 to 17 and Comparative Examples 4 to 5

Phosphoric esters represented by the following general formula (5), which are compounds represented by general formula (2), were prepared via an esterification reaction between alkyl alcohol and phosphoric acid.

General Formula (5):

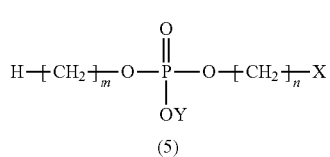

[Chemical formula 8]

(5)

At this time, the number of carbon atoms in the arkyl group of the alkyl alcohol and the kind of salt used to neutralize the phosphate group were varied. That is, the structural parameters m, n, m+n, X, and Y in general formula (5) were varied as shown in Table 3 to produce compounds 12 to 21.

AA alkaline dry batteries were prepared in the same manner as in Example 1 with the addition of the compounds 12 to 21 to the negative electrode, and they were evaluated in the same manner as described above. These evaluation results are shown in Table 3.

The batteries of Comparative Examples 4 and 5 showed a large voltage drop and a decline in discharge performance since the movement or diffusion of the surfactant in the alkaline electrolyte was hindered due to the large number of carbon atoms in the molecules of the phosphoric ester.

Contrary to this, the batteries of Examples 10 to 17 of the present invention, where in general formula (5), m and n are 1 to 6 and m+n is 6 or less, exhibited a small voltage drop, good discharge performance and excellent leakage resistance.

《Examples 18 to 23》

Phosphoric esters represented by the following general formula (6), which are compounds represented by general formula (3), were prepared via an alkylation reaction of phosphoric acid.

General Formula (6):

[Chemical formula 9]

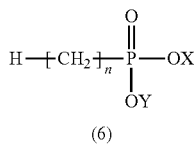

(6)

At this time, the number of carbon atoms in the arkyl group and the kind of salt used to neutralize the phosphate group were changed to vary the structural parameters n, X, and Y in general formula (6) as shown in Table 4, to obtain compounds 22 to 27.

AA alkaline dry batteries were prepared in the same manner as in Example 1 with the addition of the compounds 22 to 27 to the negative electrode, and they were evaluated in the same manner as described above. These evaluation results are shown in Table 4.

TABLE 4

| | Negative electrode Surfactant | | | AA alkaline dry battery | | | | |
|---|---|---|---|---|---|---|---|---|
| | | Structural parameter | | | Number of leaked batteries upon storage at 60° C. | | Voltage drop upon start of 2.0 A discharge (V) | Discharge performance (ratio) |
| | Compound No. | N | X | Y | 4 months | 8 months | 12 months | | |
| Ex. 18 | Compound 22 | 1 | Na | Na | 0 | 0 | 0 | 0.204 | 118 |
| Ex. 19 | Compound 23 | 4 | Na | Na | 0 | 0 | 0 | 0.206 | 120 |
| Ex. 20 | Compound 24 | 4 | H | Na | 0 | 0 | 0 | 0.213 | 119 |
| Ex. 21 | Compound 25 | 4 | H | H | 0 | 0 | 0 | 0.206 | 120 |
| Ex. 22 | Compound 26 | 4 | K | K | 0 | 0 | 0 | 0.209 | 118 |
| Ex. 23 | Compound 27 | 6 | Na | Na | 0 | 0 | 0 | 0.219 | 116 |
| Comp. Ex. 1 | | | | | 0 | 3 | 6 | 0.191 | 121 |

The batteries of Examples 18 to 23 of the present invention, where in general formula (6), n is 1 to 6, exhibited a small voltage drop, good discharge performance and excellent leakage resistance. Also, the results of the batteries of Examples 19 to 22 showed that changing X and Y in general formula (6) to H, Na, or K makes no particular difference in battery characteristics.

《Examples 24 to 33》

The amount of surfactant added to the negative electrode was examined.

The amount of surfactant (compound 2, 19 or 23) added to the negative electrode was varied to the values shown in Table 5. In Table 5, the amount of surfactant added to the negative electrode represents the amount (parts by weight) per 100 parts by weight of the zinc alloy powder. More specifically, in the preparation of the gelled negative electrode, the alkaline electrolyte, surfactant (compounds 2, 19 and 23), sodium polyacrylate, and zinc alloy powder were mixed together in a weight ratio of 50:a:1.5:100, and the amount (a) of surfactant added was varied. Except for this, in the same manner as in Examples 2, 15, or 19, alkaline dry batteries were produced, and they were evaluated in the above manner.

These evaluation results are shown in Table 5 together with the results of Examples 2, 15, 19 and Comparative Example 1.

TABLE 5

| | Negative electrode Surfactant | | AA alkaline dry battery | | | | |
|---|---|---|---|---|---|---|---|
| | Compound No. | Amount added (part by weight) | Number of leaked batteries upon storage At 60° C. | | | Voltage drop upon start of 2.0 A discharge (V) | Discharge performance (ratio) |
| | | | 4 months | 8 months | 12 months | | |
| Ex. 24 | Compound 2 | 0.003 | 0 | 1 | 4 | 0.195 | 120 |
| Ex. 25 | Compound 2 | 0.005 | 0 | 0 | 0 | 0.195 | 121 |
| Ex. 26 | Compound 2 | 0.02 | 0 | 0 | 0 | 0.196 | 124 |
| Ex. 2 | Compound 2 | 0.1 | 0 | 0 | 0 | 0.199 | 123 |
| Ex. 27 | Compound 2 | 0.3 | 0 | 0 | 0 | 0.220 | 120 |
| Ex. 28 | Compound 2 | 1 | 0 | 0 | 0 | 0.239 | 111 |
| Ex. 29 | Compound 2 | 1.25 | 0 | 0 | 0 | 0.261 | 104 |
| Ex. 30 | Compound 19 | 0.005 | 0 | 0 | 0 | 0.201 | 122 |
| Ex. 15 | Compound 19 | 0.1 | 0 | 0 | 0 | 0.203 | 121 |
| Ex. 31 | Compound 19 | 1 | 0 | 0 | 0 | 0.233 | 115 |
| Ex. 32 | Compound 23 | 0.005 | 0 | 0 | 0 | 0.198 | 122 |
| Ex. 19 | Compound 23 | 0.1 | 0 | 0 | 0 | 0.206 | 120 |
| Ex. 33 | Compound 23 | 1 | 0 | 0 | 0 | 0.240 | 112 |
| Comp. Ex. 1 | | | 0 | 3 | 6 | 0.191 | 121 |

The batteries of Examples 2, 15, 19, and 24 to 33 showed a small voltage drop upon start of discharge, good discharge performance, and improved leakage resistance.

The batteries of Examples 2, 15, 19, 25 to 28, and 30 to 33, where the amount of surfactant added to the negative electrode was 0.005 to 1 part by weight per 100 parts by weight of the zinc alloy powder, exhibited excellent leakage resistance and discharge performance.

《Examples 34 to 44》

The amount of bismuth in the zinc alloy was examined.

Alkaline dry batteries were prepared in the same manner as in Examples 2, 15, or 19, except that in the preparation of the gelled negative electrode, the aluminum content in the zinc alloy powder was set to 50 ppm, the indium content to 250 ppm, and the bismuth content to the values as shown in Table 6, and they were evaluated in the above manner.

These evaluation results are shown in Table 6.

TABLE 6

| | Negative electrode | | AA alkaline dry battery | | | | |
|---|---|---|---|---|---|---|---|
| | Surfactant Compound No. | Zinc alloy Bismuth content (ppm) | Number of leaked batteries upon storage at 60° C. | | | Voltage drop upon start of 2.0 A discharge (V) | Discharge performance (ratio) |
| | | | 4 months | 8 months | 12 months | | |
| Ex. 34 | Compound 2 | 15 | 0 | 0 | 3 | 0.195 | 130 |
| Ex. 35 | Compound 2 | 30 | 0 | 0 | 0 | 0.208 | 127 |
| Ex. 36 | Compound 2 | 80 | 0 | 0 | 0 | 0.203 | 125 |
| Ex. 2 | Compound 2 | 200 | 0 | 0 | 0 | 0.199 | 123 |
| Ex. 37 | Compound 2 | 250 | 0 | 0 | 0 | 0.211 | 119 |
| Ex. 38 | Compound 2 | 300 | 0 | 0 | 0 | 0.215 | 104 |
| Ex. 39 | Compound 19 | 30 | 0 | 0 | 0 | 0.200 | 125 |
| Ex. 40 | Compound 19 | 80 | 0 | 0 | 0 | 0.196 | 123 |
| Ex. 15 | Compound 19 | 200 | 0 | 0 | 0 | 0.203 | 121 |
| Ex. 41 | Compound 19 | 250 | 0 | 0 | 0 | 0.208 | 117 |
| Ex. 42 | Compound 23 | 30 | 0 | 0 | 0 | 0.202 | 127 |
| Ex. 43 | Compound 23 | 80 | 0 | 0 | 0 | 0.199 | 123 |
| Ex. 19 | Compound 23 | 200 | 0 | 0 | 0 | 0.206 | 120 |
| Ex. 44 | Compound 23 | 250 | 0 | 0 | 0 | 0.206 | 116 |

The batteries of Examples 2, 15, 19, and 34 to 44 showed a small voltage drop upon start of discharge, good discharge performance, and improved leakage resistance.

The batteries of Examples 2, 15, 19, 35 to 37, and 39 to 44, in which the bismuth content in the zinc alloy composition was 30 to 250 ppm, showed excellent leakage resistance and discharge performance.

《Examples 45 to 52 and Comparative Examples 6 to 10》

The content of the zinc alloy powder in the negative electrode was examined.

The content of the zinc powder alloy in the negative electrode was changed to the values shown in Table 7. The content of the zinc powder alloy in the negative electrode in Table 7 represents the amount (parts by weight) per 100 parts by weight of the alkaline electrolyte. More specifically, in the preparation of the gelled negative electrode, the alkaline electrolyte, surfactant (compounds 2, 19 or 23), sodium polyacrylate, and zinc alloy powder were mixed together in a weight ratio of 100:0.1β:3.0:β, and the content (B) of the zinc alloy powder was varied.

Next, the density of the negative electrode was measured, and based on the measured value, the negative electrode in the amount shown in Table 7 was charged into the space inside the separator. In Table 7, the density of the negative electrode was expressed as a ratio relative to the density of the negative electrode of Example 2, which was defined as 100.

Except for the above, in the same manner as in Examples 2, 15, or 19, alkaline dry batteries were produced, and they were evaluated in the above manner (Examples 45 to 52).

Also, alkaline dry batteries were produced in the same manner as in Examples 2 and 45 to 48 except that no surfactant was added, and they were evaluated in the above manner (Comparative Examples 6 to 10).

These evaluation results are shown in Table 7 together with the results of the batteries of Examples 2, 15, and 19.

TABLE 7

| | Negative electrode | | | AA alkaline dry battery | | | | |
|---|---|---|---|---|---|---|---|---|
| | Surfactant | Content of zinc alloy powder | Density | Amount filled | Number of leaked batteries upon storage at 60° C. | | | Voltage drop upon start of 2.0 A discharge | Discharge performance |
| | Compound No. | (part by weight) | (ratio) | (g) | 4 months | 8 months | 12 months | (V) | (ratio) |
| Ex. 45 | Compound 2 | 160 | 88 | 6.05 | 0 | 0 | 0 | 0.211 | 103 |
| Ex. 46 | Compound 2 | 170 | 96 | 6.35 | 0 | 0 | 0 | 0.206 | 113 |
| Ex. 2 | Compound 2 | 200 | 100 | 6.50 | 0 | 0 | 0 | 0.199 | 123 |
| Ex. 47 | Compound 2 | 220 | 109 | 6.90 | 0 | 0 | 0 | 0.204 | 115 |
| Ex. 48 | Compound 2 | 230 | 112 | 6.95 | 0 | 0 | 0 | 0.197 | 104 |
| Ex. 49 | Compound 19 | 170 | 95 | 6.35 | 0 | 0 | 0 | 0.212 | 115 |
| Ex. 15 | Compound 19 | 200 | 100 | 6.50 | 0 | 0 | 0 | 0.203 | 121 |
| Ex. 50 | Compound 19 | 220 | 109 | 6.90 | 0 | 0 | 0 | 0.215 | 116 |
| Ex. 51 | Compound 23 | 170 | 95 | 6.35 | 0 | 0 | 0 | 0.199 | 113 |
| Ex. 19 | Compound 23 | 200 | 99 | 6.50 | 0 | 0 | 0 | 0.206 | 120 |
| Ex. 52 | Compound 23 | 220 | 108 | 6.85 | 0 | 0 | 0 | 0.203 | 114 |
| Comp. Ex. 6 | | 160 | 100 | | | | | | |
| Comp. Ex. 7 | | 170 | 102 | | | | | | |
| Comp. Ex. 8 | | 200 | 106 | | | | | | |
| Comp. Ex. 9 | | 220 | 113 | | | | | | |
| Comp. Ex. 10 | | 230 | 114 | | | | | | |

The batteries of Examples 2, 15, 19 and 45 to 52 exhibited a small voltage drop upon start of discharge and excellent leakage resistance.

A comparison between the densities of the negative electrodes of Comparative Examples 6 to 10 including no surfactant and the densities of the negative electrodes of Examples 2 and 45 to 48 including a surfactant confirmed that the higher the content of the zinc alloy powder in the negative electrode, the more likely the decrease in negative electrode density due to foaming is suppressed.

The batteries of Examples 2, 15, 19, 46, 47, and 49 to 52, in which the content of the zinc alloy powder in the negative electrode containing the compound 2, 19, or 23 as the surfactant was 170 to 220 parts by weight per 100 parts by weight of the alkaline electrolyte, provided excellent discharge performance since the density of the negative electrode was high and a sufficient amount of electrolyte was present in the negative electrode.

《Examples 53 to 59》

The form of the zinc alloy powder was examined.

In the preparation of the gelled negative electrode, the content of the particles with particle sizes of 75 μm or less in the zinc alloy powder was varied as shown in Table 8. Except for this, in the same manner as in Examples 2, 15, or 19, alkaline dry batteries were produced, and they were evaluated in the above manner.

The evaluation results are shown in Table 8 together with the results of Examples 2, 15, and 19.

TABLE 8

| | Negative electrode | | AA alkaline dry battery | | | | |
|---|---|---|---|---|---|---|---|
| | Surfactant | Zinc alloy powder Content of particles of 75 μm or less | Number of leaked batteries upon storage at 60° C. | | | Voltage drop upon start of 2.0 A | Discharge performance |
| | Compound No. | (wt %) | 4 months | 8 months | 12 months | discharge (V) | (ratio) |
| Ex. 53 | Compound 2 | 3 | 0 | 0 | 0 | 0.231 | 104 |
| Ex. 54 | Compound 2 | 5 | 0 | 0 | 0 | 0.226 | 108 |
| Ex. 2 | Compound 2 | 25 | 0 | 0 | 0 | 0.199 | 123 |
| Ex. 55 | Compound 2 | 45 | 0 | 0 | 0 | 0.192 | 134 |

TABLE 8-continued

|  | Negative electrode | | AA alkaline dry battery | | | | |
|---|---|---|---|---|---|---|---|
|  | Surfactant Compound No. | Zinc alloy powder Content of particles of 75 μm or less (wt %) | Number of leaked batteries upon storage at 60° C. | | | Voltage drop upon start of 2.0 A discharge (V) | Discharge performance (ratio) |
|  | | | 4 months | 8 months | 12 months | | |
| Ex. 56 | Compound 19 | 5 | 0 | 0 | 0 | 0.219 | 109 |
| Ex. 15 | Compound 19 | 25 | 0 | 0 | 0 | 0.203 | 121 |
| Ex. 57 | Compound 19 | 45 | 0 | 0 | 0 | 0.196 | 132 |
| Ex. 58 | Compound 23 | 5 | 0 | 0 | 0 | 0.235 | 107 |
| Ex. 19 | Compound 23 | 25 | 0 | 0 | 0 | 0.206 | 120 |
| Ex. 59 | Compound 23 | 45 | 0 | 0 | 0 | 0.197 | 130 |

The batteries of Examples 2, 15, 19, and 53 to 59 exhibited a small voltage drop upon start of discharge and excellent leakage resistance.

The batteries of Examples 2, 15, 19, and 54 to 59, in which the content of the particles with particle sizes of am or less in the zinc alloy powder was 5 to 45% by weight, showed excellent discharge performance. When the content of the particles with particle sizes of 75 μm or less in the zinc alloy powder exceeds 45% by weight, the viscosity of the gelled negative electrode rises, thereby resulting in a decrease in productivity in the step of filling the negative electrode.

《Examples 60 to 67 and Comparative Examples 11 to 14》

Examinations were made on the nickel-containing layer formed on the inner face of the battery case. Specifically, a Ni—Fe layer was formed on the inner face of the battery case 1. The details are shown below.

Battery cases were produced in the same manner as in Example 1 except that the annealing time in the annealing step was varied between 3 to 9 hours. In this way, the average thickness of the Ni—Fe layer on the inner face of the battery case was changed to the various values as shown in Table 9.

Alkaline dry batteries were produced in the same manner as in Examples 2, 15, or 19 except for the use of these battery cases, and they were evaluated in the above manner (Examples 60 to 67).

Also, alkaline dry batteries were produced in the same manner as in Examples 60, 61, 64, and 67 except that no surfactant was added to the negative electrode, and they were evaluated in the above manner (Comparative Examples 11 to 14).

These evaluation results are shown in Table 9.

TABLE 9

|  | Negative electrode Surfactant Compound No. | Battery case Ni—Fe layer Average thickness (μm) | AA alkaline dry battery | | | | |
|---|---|---|---|---|---|---|---|
|  | | | Number of leaked batteries upon storage at 60° C. | | | Voltage drop upon start of 2.0 A discharge (V) | Discharge performance (ratio) |
|  | | | 4 months | 8 months | 12 months | | |
| Ex. 60 | Compound 2 | 1.5 | 0 | 0 | 0 | 0.209 | 119 |
| Ex. 2 | Compound 2 | 1.0 | 0 | 0 | 0 | 0.199 | 123 |
| Ex. 15 | Compound 19 | 1.0 | 0 | 0 | 0 | 0.203 | 121 |
| Ex. 19 | Compound 23 | 1.0 | 0 | 0 | 0 | 0.206 | 120 |
| Ex. 61 | Compound 2 | 0.5 | 0 | 0 | 0 | 0.221 | 117 |
| Ex. 62 | Compound 19 | 0.5 | 0 | 0 | 0 | 0.204 | 124 |
| Ex. 63 | Compound 23 | 0.5 | 0 | 0 | 0 | 0.210 | 120 |
| Ex. 64 | Compound 2 | 0.05 | 0 | 0 | 0 | 0.224 | 122 |
| Ex. 65 | Compound 19 | 0.05 | 0 | 0 | 0 | 0.219 | 118 |
| Ex. 66 | Compound 23 | 0.05 | 0 | 0 | 0 | 0.205 | 123 |
| Ex. 67 | Compound 2 | 0.02 | 0 | 2 | 9 | 0.210 | 124 |
| Comp. Ex. 11 | | 1.5 | 0 | 0 | 0 | | |
| Comp. Ex. 1 | | 1.0 | 0 | 3 | 6 | | |
| Comp. Ex. 12 | | 0.5 | 0 | 5 | 25 | | |
| Comp. Ex. 13 | | 0.05 | 0 | 7 | 36 | | |
| Comp. Ex. 14 | | 0.02 | 1 | 15 | 81 | | |

《Examples 68 to 78 and
Comparative Examples 15 to 19》

Battery cases with Ni layers of the average thicknesses shown in Table 10 on the inner face were produced in the same manner as in Example 1, except that the electrolytic time in the electrolytic plating step was varied under the conditions shown in Table 1 and that the annealing step was not performed.

Alkaline dry batteries were produced in the same manner as in Examples 2, 15, or 19 except for the use of these battery cases, and they were evaluated in the above manner (Examples 68 to 78).

Also, alkaline dry batteries were produced in the same manner as in Examples 68, 69, 72, 75, and 78 except that no surfactant was added to the negative electrode, and they were evaluated in the above manner (Comparative Examples 15 to 19).

These evaluation results are shown in Table 10.

TABLE 11

| Item | Condition | |
|---|---|---|
| Bath composition | Stannous sulfate | 30 g/L |
| | Phenolsulfonic acid | 60 g/L |
| | Ethoxylated naphthol | 5 g/L |
| Bath temperature | | 50° C. |
| Current density | | 0.1 A/cm$^2$ |

Battery cases with a Ni—Sn layer formed on the inner face were produced in the same manner as in Example 1 except for the use of the above-mentioned steel plate with the Ni—Sn layer on each side thereof. At this time, in the annealing step, the annealing time was varied between 3 to 9 to produce battery cases with Ni—Sn layers of the various average thicknesses shown in Table 12 on the inner face.

Alkaline dry batteries were produced in the same manner as in Examples 2, 15, or 19 except for the use of these battery

TABLE 10

| | | | AA alkaline dry battery | | | | |
|---|---|---|---|---|---|---|---|
| | Negative electrode | Battery case Ni layer Average | Number of leaked batteries upon storage at 60° C. | | | Voltage drop upon start of 2.0 A | Discharge |
| | Surfactant Compound No. | thickness (μm) | 4 months | 8 months | 12 months | discharge (V) | performance (ratio) |
| Ex. 68 | Compound 2 | 1.5 | 0 | 0 | 0 | 0.210 | 117 |
| Ex. 69 | Compound 2 | 1.0 | 0 | 0 | 0 | 0.217 | 120 |
| Ex. 70 | Compound 19 | 1.0 | 0 | 0 | 0 | 0.214 | 121 |
| Ex. 71 | Compound 23 | 1.0 | 0 | 0 | 0 | 0.204 | 120 |
| Ex. 72 | Compound 2 | 0.5 | 0 | 0 | 0 | 0.202 | 122 |
| Ex. 73 | Compound 19 | 0.5 | 0 | 0 | 0 | 0.215 | 123 |
| Ex. 74 | Compound 23 | 0.5 | 0 | 0 | 0 | 0.200 | 120 |
| Ex. 75 | Compound 2 | 0.05 | 0 | 0 | 0 | 0.201 | 122 |
| Ex. 76 | Compound 19 | 0.05 | 0 | 0 | 0 | 0.205 | 118 |
| Ex. 77 | Compound 23 | 0.05 | 0 | 0 | 0 | 0.208 | 123 |
| Ex. 78 | Compound 2 | 0.02 | 1 | 5 | 33 | 0.217 | 124 |
| Comp. Ex. 15 | | 1.5 | 0 | 0 | 0 | | |
| Comp. Ex. 16 | | 1.0 | 0 | 2 | 7 | | |
| Comp. Ex. 17 | | 0.5 | 0 | 6 | 37 | | |
| Comp. Ex. 18 | | 0.05 | 1 | 10 | 51 | | |
| Comp. Ex. 19 | | 0.02 | 2 | 23 | 97 | | |

《Examples 79 to 89 and
Comparative Examples 20 to 24》

The same nickel-plated steel plate as that used in Example 1 was electrolytically plated with tin under the conditions shown in Table 11. This steel plate was then annealed at a soaking temperature of 550° C. and a dew point of −40° C. using a protective gas composed of 6.5% of hydrogen gas and 93.5% of nitrogen gas. In this way, a Ni—Sn layer was formed on each side of the steel plate.

cases, and they were evaluated in the above manner (Examples 79 to 89).

Also, alkaline dry batteries were produced in the same manner as in Examples 79, 80, 83, 86, and 89 except that no surfactant was added to the negative electrode, and they were evaluated in the above manner (Comparative Examples 20 to 24).

These evaluation results are shown in Table 12.

TABLE 12

| | Battery | AA alkaline dry battery | | | | |
|---|---|---|---|---|---|---|
| Negative electrode Surfactant | case Ni—Sn layer Average | Number of leaked batteries upon storage at 60° C. | | | Voltage drop upon start of 2.0 A | Discharge |
| Compound No. | thickness (μm) | 4 months | 8 months | 12 months | discharge (V) | performance (ratio) |
| Ex. 79 | Compound 2 | 1.5 | 0 | 0 | 0 | 0.205 | 119 |
| Ex. 80 | Compound 2 | 1.0 | 0 | 0 | 0 | 0.211 | 120 |
| Ex. 81 | Compound 19 | 1.0 | 0 | 0 | 0 | 0.195 | 123 |
| Ex. 82 | Compound 23 | 1.0 | 0 | 0 | 0 | 0.213 | 120 |
| Ex. 83 | Compound 2 | 0.5 | 0 | 0 | 0 | 0.221 | 122 |
| Ex. 84 | Compound 19 | 0.5 | 0 | 0 | 0 | 0.219 | 117 |
| Ex. 85 | Compound 23 | 0.5 | 0 | 0 | 0 | 0.208 | 124 |
| Ex. 86 | Compound 2 | 0.05 | 0 | 0 | 0 | 0.198 | 119 |
| Ex. 87 | Compound 19 | 0.05 | 0 | 0 | 0 | 0.202 | 122 |
| Ex. 88 | Compound 23 | 0.05 | 0 | 0 | 0 | 0.199 | 119 |
| Ex. 89 | Compound 2 | 0.02 | 0 | 4 | 15 | 0.207 | 124 |
| Comp. Ex. 20 | | 1.5 | 0 | 0 | 0 | | |
| Comp. Ex. 21 | | 1.0 | 0 | 1 | 13 | | |
| Comp. Ex. 22 | | 0.5 | 0 | 11 | 61 | | |
| Comp. Ex. 23 | | 0.05 | 1 | 14 | 89 | | |
| Comp. Ex. 24 | | 0.02 | 3 | 23 | 116 | | |

《Examples 90 to 100 and Comparative Examples 25 to 29》

Battery cases with Ni—Co layers of the average thicknesses shown in Table 14 on the inner face were produced in the same manner as in Example 1, except that the electrolytic time in the electrolytic plating step was varied under the conditions shown in Table 13 and that the annealing step was not performed.

TABLE 13

| Item | Condition | |
|---|---|---|
| Bath composition | Nickel sulfate | 300 g/L |
| | Cobalt chloride | 45 g/L |
| | Cobalt sulfate | 5 g/L |
| | Boric acid | 30 g/L |

TABLE 13-continued

| Item | Condition |
|---|---|
| Bath temperature | 60° C. |
| Current density | 0.1 A/cm² |

Alkaline dry batteries were produced in the same manner as in Examples 2, 15, or 19 except for the use of these battery cases, and they were evaluated in the above manner (Examples 99 to 100).

Also, alkaline dry batteries were produced in the same manner as in Examples 90, 91, 94, 97, and 100 except that no surfactant was added to the negative electrode, and they were evaluated in the above manner (Comparative Examples 25 to 29).

These evaluation results are shown in Table 14.

TABLE 14

| | Battery case | AA alkaline dry battery | | | | |
|---|---|---|---|---|---|---|
| Negative electrode Surfactant | Ni—Co layer Average | Number of leaked batteries upon storage at 60° C. | | | Voltage drop upon start of 2.0 A | Discharge |
| Compound No. | thickness (μm) | 4 months | 8 months | 12 months | discharge (V) | performance (ratio) |
| Ex. 90 | Compound 2 | 1.5 | 0 | 0 | 0 | 0.210 | 117 |
| Ex. 91 | Compound 2 | 1.0 | 0 | 0 | 0 | 0.223 | 118 |
| Ex. 92 | Compound 19 | 1.0 | 0 | 0 | 0 | 0.207 | 120 |
| Ex. 93 | Compound 23 | 1.0 | 0 | 0 | 0 | 0.217 | 123 |
| Ex. 94 | Compound 2 | 0.5 | 0 | 0 | 0 | 0.208 | 118 |
| Ex. 95 | Compound 19 | 0.5 | 0 | 0 | 0 | 0.203 | 123 |
| Ex. 96 | Compound 23 | 0.5 | 0 | 0 | 0 | 0.199 | 121 |
| Ex. 97 | Compound 2 | 0.05 | 0 | 0 | 0 | 0.207 | 120 |
| Ex. 98 | Compound 19 | 0.05 | 0 | 0 | 0 | 0.214 | 121 |
| Ex. 99 | Compound 23 | 0.05 | 0 | 0 | 0 | 0.196 | 119 |
| Ex. 100 | Compound 2 | 0.02 | 0 | 2 | 8 | 0.218 | 118 |
| Comp. Ex. 25 | | 1.5 | 0 | 0 | 0 | | |

TABLE 14-continued

| | Battery case | | AA alkaline dry battery | | | | |
|---|---|---|---|---|---|---|---|
| | Negative electrode Surfactant | Ni—Co layer Average | Number of leaked batteries upon storage at 60° C. | | | Voltage drop upon start of 2.0 A | Discharge performance |
| | Compound No. | thickness (μm) | 4 months | 8 months | 12 months | discharge (V) | (ratio) |
| Comp. Ex. 26 | | 1.0 | 0 | 5 | 22 | | |
| Comp. Ex. 27 | | 0.5 | 0 | 13 | 61 | | |
| Comp. Ex. 28 | | 0.05 | 1 | 18 | 96 | | |
| Comp. Ex. 29 | | 0.02 | 3 | 25 | 137 | | |

In the following, Table 9, Table 10, Table 12, and Table 14 are explained.

In the case of the alkaline dry batteries including no surfactant in the negative electrode, leakage occurred when the average thickness of various Ni-containing layers on the inner face of the battery case was 1.0 μm or less (Comparative Examples 1, 12 to 14, and 16 to 19, 21 to 24, and 26 to 29). This is because iron dissolved into the alkaline electrolyte from the battery case was deposited on the zinc alloy particles of the negative electrode, thereby resulting in an increase in the amount of gas produced.

The alkaline dry batteries of Examples 60 to 100 exhibited a reduced voltage drop upon start of discharge and improved leakage resistance due to the addition of the surfactant.

The alkaline dry batteries with the surfactant added to the negative electrode showed a small voltage drop, good discharge performance, and excellent leakage resistance when the average thickness of the nickel-containing layer on the inner face of the battery case was 0.05 μm or more (Examples 2, 15, 19, 60 to 66, 68 to 77, 79 to 88, and 90 to 99).

When the average thickness of the Ni-containing layer on the inner face of the battery case exceeds 1.0 μm, the material costs are expensive and it is thus difficult to obtain substantial cost merit (Examples 60, 68, 79, and 90).

In view of the above, it was found that the average thickness of the nickel-containing layer on the inner face of the battery case is preferably 0.05 to 1.0 μm.

《Examples 101 to 111 and Comparative Examples 30 to 34》

Examinations were made on battery cases to which nickel plating was applied after can-making, without forming a nickel-containing layer before can-making.

Using a 0.4-mm thick, cold-rolled steel plate, iron cases were produced by the DI process in the same manner as in Example 1. The iron cases were plated with nickel by barrel plating in which the electrolytic time was varied under the conditions shown in Table 15. In this way, battery cases with nickel layers of the average thicknesses shown in Table 16 on the inner face were produced.

TABLE 15

| Item | Condition | |
|---|---|---|
| Bath composition | Nickel sulfate | 320 g/L |
| | Nickel chloride | 40 g/L |
| | Boric acid | 30 g/L |
| Bath temperature | | 55° C. |
| Current density | | 0.1 A/cm$^2$ |
| pH | | 4.3 |

Alkaline dry batteries were produced in the same manner as in Examples 2, 15, or 19 except for the use of these battery cases, and they were evaluated in the above manner (Examples 101 to 111).

Also, alkaline dry batteries were produced in the same manner as in Examples 101, 102, 105, 108, and 111 except that no surfactant was added to the negative electrode, and they were evaluated in the above manner (Comparative Examples to 34).

These evaluation results are shown in Table 16.

TABLE 16

| | Battery case | | AA alkaline dry battery | | | | |
|---|---|---|---|---|---|---|---|
| | Negative electrode Surfactant | Ni layer (barrel plating) Average | Number of leaked batteries upon storage at 60° C. | | | Voltage drop upon start of 2.0 A | Discharge performance |
| | Compound No. | thickness (μm) | 4 months | 8 months | 12 months | discharge (V) | (ratio) |
| Ex. 101 | Compound 2 | 1.5 | 0 | 0 | 0 | 0.202 | 120 |
| Ex. 102 | Compound 2 | 1.0 | 0 | 0 | 0 | 0.205 | 120 |
| Ex. 103 | Compound 19 | 1.0 | 0 | 0 | 0 | 0.218 | 122 |
| Ex. 104 | Compound 23 | 1.0 | 0 | 0 | 0 | 0.199 | 119 |
| Ex. 105 | Compound 2 | 0.5 | 0 | 0 | 0 | 0.220 | 120 |
| Ex. 106 | Compound 19 | 0.5 | 0 | 0 | 0 | 0.222 | 121 |
| Ex. 107 | Compound 23 | 0.5 | 0 | 0 | 0 | 0.219 | 117 |

TABLE 16-continued

|  | Battery case | | AA alkaline dry battery | | | | |
|---|---|---|---|---|---|---|---|
|  | Negative electrode Surfactant | Ni layer (barrel plating) Average | Number of leaked batteries upon storage at 60° C. | | | Voltage drop upon start of 2.0 A | Discharge performance |
|  | Compound No. | thickness (μm) | 4 months | 8 months | 12 months | discharge (V) | (ratio) |
| Ex. 108 | Compound 2 | 0.05 | 0 | 0 | 0 | 0.204 | 121 |
| Ex. 109 | Compound 19 | 0.05 | 0 | 0 | 0 | 0.214 | 119 |
| Ex. 110 | Compound 23 | 0.05 | 0 | 0 | 0 | 0.217 | 121 |
| Ex. 111 | Compound 2 | 0.02 | 1 | 6 | 29 | 0.214 | 123 |
| Comp. Ex. 30 |  | 1.5 | 0 | 0 | 0 |  |  |
| Comp. Ex. 31 |  | 1.0 | 0 | 0 | 4 |  |  |
| Comp. Ex. 32 |  | 0.5 | 0 | 5 | 31 |  |  |
| Comp. Ex. 33 |  | 0.05 | 0 | 13 | 53 |  |  |
| Comp. Ex. 34 |  | 0.02 | 1 | 17 | 84 |  |  |

In the case of the alkaline dry batteries including no surfactant in the negative electrode, leakage occurred when the average thickness of the nickel layer on the inner face of the battery case was 1.0 μm or less (Comparative Examples 31 to 34). This is because iron dissolved into the alkaline electrolyte from the battery case was deposited on the zinc alloy particles of the negative electrode, thereby resulting in an increase in the amount of gas produced.

The alkaline dry batteries of Examples 101 to 111 exhibited a reduced voltage drop upon start of discharge and improved leakage resistance due to the addition of the surfactant.

The alkaline dry batteries with the surfactant added to the negative electrode showed a small voltage drop, good discharge performance, and excellent leakage resistance when the average thickness of the nickel-containing layer on the inner face of the battery case was 0.05 μm or more (Examples 101 to 110).

When the average thickness of the nickel layer on the inner face of the battery case exceeds 1.0 μm, the material costs are expensive and it is thus difficult to obtain substantial cost merit (Example 101).

In view of the above, it was found that the average thickness of the nickel layer on the inner face of the battery case is preferably 0.05 to 1.0 μm.

The nickel-containing layer may be a Ni—Fe layer, a Ni—Sn layer, or a Ni—Co layer besides a Ni layer.

Also, even if a nickel-containing layer is previously formed before can-making and a nickel-containing layer is further formed thereon after can-making, essentially the same effects can be obtained.

Even if the thickness of the nickel-containing layer is less than conventional one, excellent leakage resistance can be obtained. This indicates that the surfactants used in the alkaline dry batteries of the present invention are resistant to impurities such as iron.

Next, some of the alkaline dry batteries of Examples and Comparative Examples were disassembled. Their negative electrodes were collected, and iron was added to these negative electrodes. The gas production speeds of these negative electrodes were measured. For comparison, the measurement was also made of a negative electrode to which no iron was added.

By the way, when dust in the production process of alkaline dry batteries is analyzed, nickel is detected most often second to iron.

In view of the recent market trend requiring further improvement in quality and reliability, and assuming inclusion of impurities in the production process, the gas production speeds of negative electrodes with nickel added thereto were also measured in the same manner.

The amount of iron or nickel added to the negative electrode was set to 10 ppm.

This is based on the fact that 6 to 13 ppm of iron was detected from the negative electrodes of the alkaline dry batteries of Examples 67, 78, 89, 100, and 111 stored at 60° C. for 12 months. In these alkaline dry batteries, the average thickness of the nickel-containing layer on the inner face of the battery case is 0.02 μm. Due to the addition of the surfactant to these batteries, the number of leaked batteries decreased and the leakage resistance was improved, but it was not possible to completely prevent leakage.

The gas production speed of a negative electrode was determined in the following manner.

A sample was prepared by collecting 5 g of a gelled negative electrode from a disassembled alkaline dry battery and adding 10 ppm of iron or nickel thereto. The sample was placed in a gas-collecting glass container equipped with a graduated narrow tube. Liquid paraffin was then poured thereinto such that the negative electrode was completely buried without leaving air. Thereafter, the glass container was immersed in a 45° C. constant-temperature water tank and left for approximately 3 hours such that the temperature inside the glass container was kept constant. It was then stored for 3 days. The total amount of gas produced in 3 days was measured, and the gas production speed was calculated from the following formula:

Gas production speed(μl/g·day)=Total amount of gas produced in 3 days(μl)÷5(g)÷3(day)

These evaluation results are shown in Table 17.

TABLE 17

| | | | AA alkaline dry battery | | | |
|---|---|---|---|---|---|---|
| | Negative electrode Surfactant | | Gas production speed of negative electrode (μl/g·day) | | Voltage drop upon | |
| | Compound No. | Amount added (part by weight) | Not added | 10 ppm of iron added | 10 ppm of nickel added | start of 2.0 A discharge (V) | Discharge perforMance (Ratio) |
| Ex. 24 | Compound 2 | 0.003 | 2.6 | 4.9 | 4.7 | 0.195 | 120 |
| Ex. 25 | Compound 2 | 0.005 | 2.2 | 3.8 | 3.8 | 0.195 | 121 |
| Ex. 2 | Compound 2 | 0.1 | 1.9 | 3.3 | 3.1 | 0.199 | 123 |
| Ex. 28 | Compound 2 | 1 | 1.6 | 3.1 | 2.8 | 0.239 | 111 |
| Ex. 30 | Compound 19 | 0.005 | 2.0 | 3.9 | 3.6 | 0.201 | 122 |
| Ex. 15 | Compound 19 | 0.1 | 2.2 | 3.5 | 3.4 | 0.203 | 121 |
| Ex. 31 | Compound 19 | 1 | 1.8 | 2.9 | 2.6 | 0.233 | 115 |
| Ex. 32 | Compound 23 | 0.005 | 2.5 | 4.0 | 3.7 | 0.198 | 122 |
| Ex. 19 | Compound 23 | 0.1 | 2.0 | 3.3 | 2.9 | 0.206 | 120 |
| Ex. 33 | Compound 23 | 1 | 1.9 | 3.2 | 3.1 | 0.240 | 112 |
| Comp. Ex. 3 | Compound 11 | 0.1 | 2.3 | 4.8 | 4.7 | 0.316 | 100 |
| Comp. Ex. 1 | | | 4.6 | 7.8 | 7.3 | 0.191 | 121 |

In the AA alkaline dry batteries of the present invention made with the negative electrodes containing 0.005 to 1 part by weight of compounds 2, 19, and 23, the voltage drop upon start of discharge at 2.0 A was 0.24 V or less, and the gas production speed of the negative electrode was 2.5 μl/g·day or less. Also, the gas production speed of the negative electrode with 10 ppm of iron added was 4.0 μl/g·day or less. The gas production speed of the negative electrode with 10 ppm of nickel added was 3.8 μl/g·day or less.

Contrary to this, in the alkaline dry battery of Comparative Example 1 where the gas production speed of the negative electrode including no iron was 4.6 μl/g·day, leakage occurred after storage at 60° C. for 8 months or more.

The above results confirmed that according to the present invention, a small voltage drop, excellent leakage resistance, and good discharge performance can be obtained, and that in the event of inclusion of iron or nickel in the negative electrode, gas production can be suppressed and excellent leakage resistance can be maintained.

In the foregoing Examples, the surfactant was added to the alkaline electrolyte used to prepare the gelled negative electrode. Since the surfactant is soluble in the alkaline electrolyte, it diffuses uniformly in the negative electrode. Besides, the surfactant may be added to the separator or the positive electrode in the production of the alkaline dry battery. Since the surfactant diffuses in the alkaline electrolyte after the production of the alkaline dry battery, essentially the same effects as in the foregoing Examples can be obtained.

Also, in the foregoing Examples, manganese dioxide was used singly as the positive electrode active material, but nickel oxyhydroxide may be used singly, or a combination of manganese dioxide and nickel oxyhydroxide may also be used.

INDUSTRIAL APPLICABILITY

The alkaline dry battery of the present invention exhibits a small voltage drop upon start of discharge, excellent leakage characteristics and good discharge performance. Therefore, it is preferably used as the power source for electronic devices, etc.

The invention claimed is:

1. An alkaline dry battery comprising:
a positive electrode including at least one of a manganese dioxide powder and a nickel oxyhydroxide powder;
a negative electrode including a zinc alloy powder;
a separator interposed between said positive electrode and said negative electrode;
an alkaline electrolyte; and
a battery case for housing said positive electrode, said negative electrode, said separator, and said alkaline electrolyte, said battery case comprising a metal case composed mainly of iron and a nickel-containing layer formed on an inner face of said metal case,
wherein said negative electrode further includes a surfactant that adsorbs to a surface of said zinc alloy powder during a non-discharge period and promptly desorbs from the surface of said zinc alloy powder upon start of discharge without impeding ion transfer in said alkaline electrolyte,
said surfactant satisfies one of the following conditions (A), (B), and (A'):
(A) said surfactant has a phosphate group as a hydrophilic group, no polyoxyalkylene group, and at least one hydrocarbon group as a hydrophobic group in the molecule thereof, and the total number of carbon atoms in said at least one hydrocarbon group is 1 to 6;
(B) said surfactant has a phosphate group and a polyoxyalkylene group as hydrophilic groups and at least one hydrocarbon group as a hydrophobic group in the molecule thereof,
the total number of carbon atoms in said at least one hydrocarbon group is 1 to 4, and
said hydrocarbon group and said polyoxyalkylene group are bonded via an oxygen atom; and
(A') said surfactant has a structure represented by general formula (3),
General formula (3):

[Chemical formula 3]

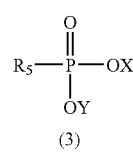

(3)

in formula (3), $R_5$ is a hydrocarbon group having 1 to 6 carbon atoms, and each of X and Y is independently H, Na or K.

2. The alkaline dry battery in accordance with claim 1, wherein said surfactant is a phosphoric ester or an alkali metal salt thereof.

3. The alkaline dry battery in accordance with claim 1, wherein said surfactant is a polyoxyethylene alkyl ether phosphoric ester or an alkali metal salt thereof.

4. The alkaline dry battery in accordance with claim 1, wherein said surfactant is at least one selected from the group consisting of compounds having structures represented by general formulas (1) and (2):

General formula (1):

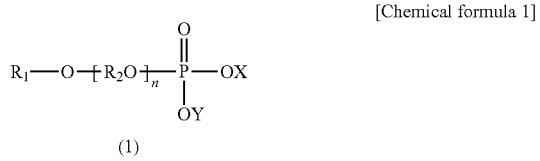

[Chemical formula 1]

(1)

in formula (1), $R_1$ is a hydrocarbon group having 1 to 4 carbon atoms, $R_2$ is —$CH_2CH_2$— or —$CH(CH_3)CH_2$—, n=1 to 8, and each of X and Y is independently H, Na, or K;

General formula (2):

[Chemical formula 2]

(2)

in formula (2), each of $R_3$ and $R_4$ is independently a hydrogen atom or a hydrocarbon group having 1 to 6 carbon atoms, the total number of carbon atoms in $R_3$ and $R_4$ is 1 to 6, and Y is H, Na, or K.

5. The alkaline dry battery in accordance with claim 4, wherein in said general formula (1), $R_1$ is $C_mH_{2m+1}$-, and m=1 to 4.

6. The alkaline dry battery in accordance with claim 4, wherein in said general formula (2), $R_3$ is $C_mH_{2m+1}$-, $R_4$ is $C_nH_{2n+1}$—, m=0 to 6, n=0 to 6, and m+n=1 to 6.

7. The alkaline dry battery in accordance with claim 1, wherein in said general formula (3), $R_5$ is $C_nH_{2n+1}$-, and n=1 to 6.

8. The alkaline dry battery in accordance with claim 1, wherein the content of said surfactant in said negative electrode is 0.005 to 1 part by weight per 100 parts by weight of said zinc alloy powder.

9. The alkaline dry battery in accordance with claim 1, wherein said zinc alloy powder contains 30 to 250 ppm of bismuth.

10. The alkaline dry battery in accordance with claim 1, wherein said negative electrode further includes a gelling agent and said alkaline electrolyte, and the content of said zinc alloy powder in said negative electrode is 170 to 220 parts by weight per 100 parts by weight of said alkaline electrolyte.

11. The alkaline dry battery in accordance with claim 1, wherein said zinc alloy powder of said negative electrode contains 5 to 45% by weight of particles with particle sizes of 75 μm or less.

12. The alkaline dry battery in accordance with claim 1, wherein said nickel-containing layer of said battery case has an average thickness of 0.05 to 1 μm.

13. The alkaline dry battery in accordance with claim 12, wherein said nickel-containing layer comprises Ni, a Ni—Fe alloy, a Ni—Sn alloy, or a Ni—Co alloy.

14. The alkaline dry battery in accordance with claim 12, wherein said battery case is prepared by press working a steel plate or nickel-plated steel plate into the shape of a can to form a metal case and applying a barrel plating to an inner surface of the metal case to form a nickel-containing layer.

15. The alkaline dry battery in accordance with claim 1, wherein said negative electrode further includes a gelling agent and said alkaline electrolyte, and said alkaline dry battery satisfies the following conditions (C) and (D):
(C) a AA alkaline dry battery in which the difference between an open-circuit voltage and a closed-circuit voltage upon discharge at 2.0 A for 10 milliseconds is 0.24 V or less; and
(D) said negative electrode produces gas at a speed of 2.5 μl/g·day or less.

16. The alkaline dry battery in accordance with claim 15 which further satisfies condition (E):
(E) when 10 ppm of iron is added to said negative electrode, said negative electrode produces gas at a speed of 4.0 μl/g·day or less.

17. The alkaline dry battery in accordance with claim 15 which further satisfies condition (F):
(F) when 10 ppm of nickel is added to said negative electrode, said negative electrode produces gas at a speed of 3.8 μl/g·day or less.

* * * * *